(12) United States Patent
Singh

(10) Patent No.: US 9,260,682 B2
(45) Date of Patent: Feb. 16, 2016

(54) DISPOSABLE WINE FERMENTATION VESSEL WITH CAP MANAGEMENT AND INTEGRAL PRESS

(71) Applicant: Vijay Singh, Far Hills, NJ (US)

(72) Inventor: Vijay Singh, Far Hills, NJ (US)

(*) Notice: Subject to any disclaimer, the term of this patent is extended or adjusted under 35 U.S.C. 154(b) by 18 days.

(21) Appl. No.: 14/089,170

(22) Filed: Nov. 25, 2013

(65) Prior Publication Data

US 2015/0147433 A1    May 28, 2015

(51) Int. Cl.
| | |
|---|---|
| C12H 1/00 | (2006.01) |
| B01F 11/00 | (2006.01) |
| C12G 1/022 | (2006.01) |
| C12H 1/22 | (2006.01) |
| C12G 1/032 | (2006.01) |
| C12H 1/02 | (2006.01) |

(52) U.S. Cl.
CPC .......... *C12G 1/0203* (2013.01); *B01F 11/0045* (2013.01); *C12G 1/0216* (2013.01); *C12H 1/22* (2013.01); *C12H 1/02* (2013.01)

(58) Field of Classification Search
CPC ........ C12H 1/22; C12H 1/02; B01F 11/0042; B01F 11/0045

USPC ............ 99/277.1, 277.2; 366/275; 222/95, 96
See application file for complete search history.

(56) References Cited

U.S. PATENT DOCUMENTS

| | | | |
|---|---|---|---|
| 3,946,780 A * | 3/1976 | Sellers | ............................ 383/66 |
| 4,474,890 A | 10/1984 | Rieger | |
| 6,703,055 B1 | 3/2004 | Klein et al. | |
| 7,377,686 B2 * | 5/2008 | Hubbard | ....................... 366/208 |
| 7,552,675 B2 | 6/2009 | Lorinez | |
| 7,891,291 B2 | 2/2011 | Lorinez | |
| 7,972,058 B2 * | 7/2011 | Furey | ............................ 366/275 |
| 8,015,915 B2 | 9/2011 | Poissant | |
| 2003/0194302 A1 * | 10/2003 | Hickinbotham | .............. 414/432 |

FOREIGN PATENT DOCUMENTS

EP       0337060 A1    10/1989

* cited by examiner

*Primary Examiner* — Reginald L Alexander
(74) *Attorney, Agent, or Firm* — Barnes & Thornburg LLP

(57) ABSTRACT

A disposable winemaking apparatus for fermenting wine containing skins, seeds, and stems that form a cap includes a single-use, dual chamber plastic bag that incorporates a mechanism to agitate and disperse the cap in order to maximize extraction of color and flavor. It also includes an integral press mechanism to squeeze out the fermented juice through a strainer, retaining the pomace in the disposable bag. The device may also be used for racking and transfer of wine during aging.

13 Claims, 7 Drawing Sheets

DISPOSABLE WINE FERMENTATION VESSEL WITH CAP MANAGEMENT AND INTEGRAL PRESS

BACKGROUND OF THE INVENTION

1. Field of the Invention

The present disclosure relates generally to fermentation devices and methods for the making of wine, and more particularly to a disposable wine fermentation vessel with cap management and integral press.

2. Statement of the Prior Art

Modern winemaking typically comprises combining winemaking ingredients in a clean, essentially sterile fermentation vessel with minimal introduction of air. For the production of red wine, these ingredients include grape skins which must be separated after fermentation. This separation operation is traditionally performed in a press.

In the fermentation of red wine, the grape skins present in the fermentation tend to float up to the top of the liquid in the fermentation vessel and form what is termed a "cap." This cap needs to be periodically broken up so that the skins may be mixed into the liquid in order to extract color and flavor compounds from the skins and seeds. The cap must also be kept moistened to prevent the growth of deleterious aerobic bacteria. Traditionally, the agitation of the cap has been done by poking the cap with a pole to break it up. This is termed "punch down" and even automated punch down devices are available. These are usually mechanically complex and require a moving seal to prevent contamination of the fermenting wine. More modern methods include pumping the liquid in the fermenter over the cap to break it up.

Other techniques include using horizontally rotating fermentation vessels such as those described in U.S. Pat. No. 4,474,890 (Rieger) and published European patent application EP0337060 (Speidel) that force the cap into the liquid. These are expensive and complex machines with large rotating assemblies, making them impractical for most wineries. U.S. Pat. No. 6,703,055 (Klein et al.) also describe a fermentation vessel with rotating mechanical agitators to flood the cap when needed. Cap management is a major factor in red wine production, since it has a tremendous impact on the wine's color and flavor, and thereby determines the value of the resulting red wine.

At the conclusion of the fermentation, the contents (i.e., fermented juice, spent skins, and yeast) are typically pumped to a press where the fermented juice is separated from the skins, seeds, and dead yeast. This is a complex and labor-intensive operation, and requires the press to by emptied and cleaned multiple times. Presses are very prone to clogging and must be emptied and cleaned manually to continue the pressing operation. Multiple transfers between the equipment also increases the risk of contamination. This problem is well recognized and there have been some attempts in the prior art (e.g., U.S. Pat. No. 7,552,675 (Lorincz) and U.S. Pat. No. 7,891,291 (Lorincz)) to develop fermentation vessels that have integral pressing capabilities. These attempts too are very complex and expensive machines with hydraulic rams under computer control. Solids, which are called "pomace" and consist of skins, stems, seeds and dead yeast, are left behind in the fermentation vessel and requires personnel to enter the vessel and shovel it out.

In certain winemaking operations, the contents of the fermentation vessel are allowed to settle and then the clarified fermented juice is removed, leaving the spent "lees" (i.e., the deposits of dead yeast or residual yeast and other particles that precipitate, or are carried by the action of "fining," to the bottom of a vat of wine after fermentation and aging) behind. This is traditionally done by siphon which takes considerable time. Transfer can be speeded up by pressurizing the fermentation vessel, but this requires the fermentation vessel to be pressure rated—considerably increasing the cost. U.S. Pat. No. 8,015,915 (Puissant) describes a fermentation vessel with internal lees containment, but this comprises a very complex conical vessel and expensive mechanical apparatus. It can be seen, therefore, that a need exists in the winemaking process to rapidly transfer liquids from one container to another without contamination.

Another major issue, especially for smaller wineries, is the disposal of waste wash water. Traditionally, winemaking equipment is made of stainless steel and this equipment must be cleaned before and after each use. The wash water contains a high biological load due to the spent grape skins and yeast. The water may also contain large amounts of harsh detergents and disinfecting chemicals. This waste water can amount to as much as 10 times the fermentation vessel volume and must be treated before discharge to streams or municipal treatment facilities. The capital and operating cost of this waste treatment can be prohibitive to a small winery. Furthermore, many communities restrict the water usage and also the discharge of waste water in order to protect the environment. Embodiments of the present invention overcome this problem by providing a pre-cleaned fermentation vessel comprising a single-use plastic bag. At the end of the fermentation, the fermented juice is pressed and most of the solids (i.e., pomace) are retained in the plastic bag which can then be disposed of as solid municipal waste or landfill. This eliminates almost all the washing requirements and manual cleaning operations.

Thus, there are four important problems to be solved in the wine fermentation process, particularly with red wines: i) a means to provide a clean, preferably sterile, anaerobic environment for the fermentation to prevent contamination; ii) a means to agitate the cap to extract flavor and color from the skins; iii) a means to press out the fermented juice without the need to transfer to another vessel; and finally iv) a means to perform all these functions with a pre-cleaned single-use disposable fermentation vessel that generates minimal waste wash water and eliminates labor-intensive cleaning. As will be evident from the description, embodiments of the present invention overcome all these problems.

SUMMARY OF THE INVENTION

Accordingly, it is one object of embodiments of the present invention to provide a fermentation vessel for the production of wine, particularly red wine, that is supplied clean and ready to use. An integral bladder may be provided to facilitate agitation of the cap and to press out the spent grape skins and yeast. The entire fermentation vessel containing most of the waste solid material may then be discarded, thus obviating any need for decontamination or cleaning. Expected advantages may include better cap management, minimal waste water generation, and a drastic reduction in labor costs. The device may also be used for secondary fermentations and for the separation of settled solids (called "racking").

The device may comprise a plastic bag with a form-fitting shape that may be contained inside a rigid outer container. The plastic bag suitably comprises a closed container with two isolated chambers. The must (i.e., grape juice, crushed grapes, skins, seeds, and stems) only contacts the inside surface of a primary or fermentation chamber of the plastic bag. These materials may be loaded into the fermentation chamber of the bag at the start of the fermentation process. The bag also comprises a secondary or pressurization chamber which may be isolated from the fermentation chamber and pressurized by an external compressed air supply. The function of this pressurization chamber will be described in greater detail herein below. But, at the start of the fermentation process, the pressurization chamber will be completely deflated.

At this starting stage, the empty bag may be partially filled with the must to be fermented leaving minimal air in the headspace. This effectively eliminates air in the fermentation, allowing for mildly anaerobic conditions that favor proliferation of the yeast, and suppresses growth of contaminating aerobic bacteria. The use of an empty bag eliminates the traditional need to purge the headspace of the fermenting tank with nitrogen or other inert gases. A spring-loaded pressure relief valve on the bag vent ensures that air from the environment does not enter the fermentation chamber. As the yeast fermentation progresses, carbon dioxide ($CO_2$) is produced and this $CO_2$ fills the headspace of the fermentation chamber so that it becomes inflated. Excess $CO_2$ may be automatically vented through the relief value to keep the headspace pressure constant. This ensures the necessary anaerobic environment. The positive pressure inside the fermentation chamber prevents contaminants from entering.

As the fermentation progresses, a cap of grape skins, seeds, and stems rises and floats on top of the fermenting liquid. This is due to the constant rising stream of $CO_2$ bubbles. It may be necessary to periodically break up and mix this cap into the bulk liquid. This may be readily achieved by inflating the secondary chamber with compressed air, thus causing the secondary chamber to expand. The fermentation chamber may be simultaneously depressurized so that when the secondary chamber expands it threes the material in the fermentation chamber to be pushed up. This squeezes the cap and forces liquid up through the cap. After a few minutes, the secondary chamber may be deflated and the fermentation chamber settles back to a horizontal configuration. The cap is now dispersed and wet. The fermentation chamber is then forced to vent through the pressure relief valve. As the fermentation continues, more $CO_2$ is produced and the fermentation chamber will inflate again. It is important that the fermentation chamber be depressurized during the mixing operation. If it is not depressurized, then the gas in the fermentation chamber will resist the expansion of the secondary chamber and there will be minimal movement of the cap. This cap mixing cycle may be repeated periodically during the fermentation, depending on the amount of cap management desired and based on the degree of color and flavor extraction desired. A simple electric blower may be used to inflate the secondary chamber. Since the secondary chamber is isolated from the fermentation chamber, no air is introduced into the fermentation.

Embodiments of the present invention take advantage of the fact that the thick mass of the cap flocculates to the upper part of the fermentation vessel. As noted above, traditional cap management methods try to push the cap down into the liquid by punch down. The cap, being buoyant, resists being pushed down and is therefore minimally dispersed by the punch down. Other techniques use a pump to circulate liquid from the bottom of the fermentation vessel to spray over the cap. This "pump-around" method only wets the cap—the trickling down through the cap is not sufficient to break up the cap. According to embodiments of the present invention, the novel and unanticipated approach is to use a "squeeze-up" method—where the entire fermenter contents are squeezed from the bottom and side, forcing liquid up through the cap which, in turn, is forced up through a cross-sectional area that is about 50% smaller than the original cross-sectional area. This upward force and reduction in cross-section shears the cap and breaks it up. Liquid from below is forced through and wets it completely. Such a gentle squeeze also extracts color and flavor faster from all parts of the cap. When the pressure is removed, the dispersed cap collapses and covers the entire cross-sectional area of the fermenter. This remarkably efficient operation may only be performed using a two chamber flexible fermentation vessel as disclosed in the embodiments of the present invention.

At the conclusion of the fermentation, cap agitation is stopped for several hours. During this time, most of the solid material in the fermentation chamber floats up to form a thick dense cap. A strainer may be connected to an outlet located on the bottom of the fermentation chamber. The headspace of the fermentation chamber may then be depressurized. The outlet to the strainer may then be opened. At this point, the secondary chamber may then be inflated. This forces the contents of the fermentation chamber out through the outlet and into the strainer. The strainer may be suitably sized to remove particulate matter, while the clear fermented juice from the strainer outlet may be collected for further processing. A duplex strainer may be used to avoid any interruption in the pressing process. The secondary chamber pressure may be regulated to provide the desired degree of pressing. Fine wines are typically pressed gently to minimize astringent components, while lower grade wines require more aggressive pressing to get a greater wine yield. Once the pressing is complete, the outlet may be closed and the strainer disconnected.

The design of the dual chamber bag is such that the fermented wine near the bottom is pumped out first and the floating cap containing bulk of the solids is pumped out last. This technique puts minimal cap solids or pomace in the strainer, but instead most of it is retained in the fermentation chamber of the original fermentation bag. The bag containing the pomace may simply be removed from the rigid containment container and disposed of in a landfill. No manual operations are needed to scrape and clean the fermentation vessel. No washing is needed, and no waste water is generated.

Other objects, advantages and novel features of the present invention will become apparent from the following detailed description of the invention when considered in conjunction with the accompanying drawings.

DETAILED DESCRIPTION OF THE INVENTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Figure 1:
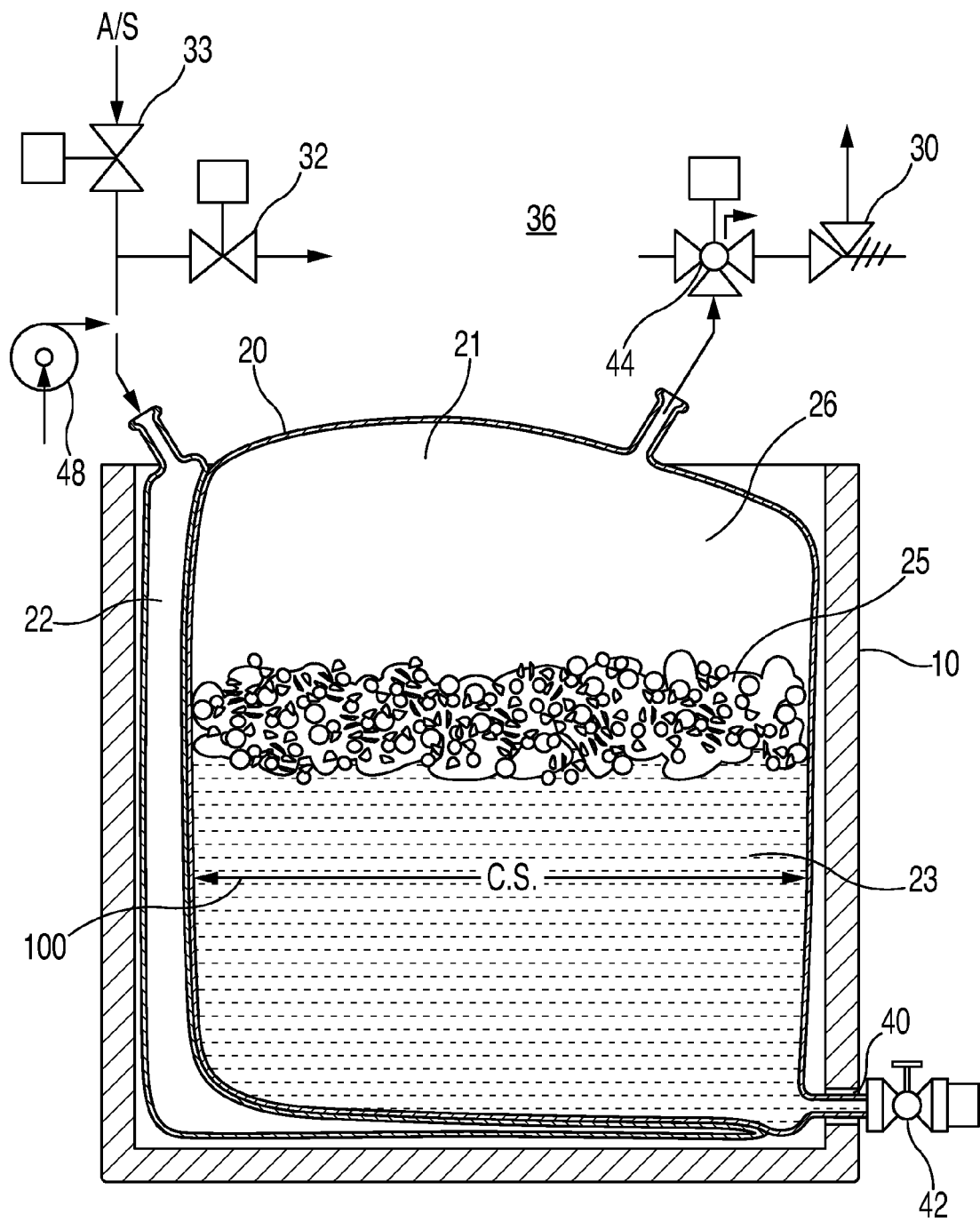
FIG. 1 is a side sectional view of the wine fermentation vessel illustrating the filled primary or fermentation chamber of the fermentation vessel with the secondary pressurization chamber deflated.

Referring now to the drawings, wherein like reference numerals and characters represent like or corresponding parts and steps throughout each of the views, there is shown in FIG. 1 a side sectional view of a wine fermentation vessel illustrating a filled primary or fermentation chamber of the fermentation vessel with a secondary or pressurization chamber deflated. In this particular embodiment, a dual chamber plastic bag may be used, such as an Air-Assist® IBC Liner, manufactured by CDF Corporation of 77 Industrial Park Road, Plymouth, Mass. 02360 USA.

These bags are manufactured for the pneumatically-assisted dispensing of high viscous materials such as syrup. In this illustrative embodiment, the bag has an overall volume of 1000 liters though these bags can be obtained in various sizes from 10 to 1000 liters. Headspace needs to be provided for evolved gases and also for movement of the cap during pressurization. A maximum of about 60% of the total bag volume may be usable for liquid (i.e., a 1000 liter bag is capable of holding about 600 liters of must). There is no limitation on the minimum volume that be fermented since the bag is empty to start with.

FIG. 1 shows a side sectional view of the wine fermentation vessel. In this embodiment, a rigid outer container 10 contains a dual chamber bag 20, which is placed inside the rigid outer container 10. The bag 20 includes a primary or fermentation chamber 21 and a secondary or pressurization chamber 22. An outlet 40 from the fermentation chamber 21 may be routed through a hole 41 in the rigid outer container 10. FIG. 1 shows a typical configuration during fermentation. Here, the fermentation chamber 21 is partially (e.g., up to 60%) full of the fermenting must 23. The headspace 26 in the fermentation chamber 21 inflates to tautness due to the $CO_2$ gas generated by the fermenting must. An electrically-actuated, 3-way valve 44 directs headspace gases through a relief valve 30 which is capable of maintaining a constant pressure. That is, a particular pressure may be set by appropriate selection of a spring in the relief valve 30. In this configuration, pressurization chamber 22 is deflated. During the fermentation, the cap 25 (i.e., spent skins, seeds, stems) floats on the top of the liquid 23. The cross-sectional area 100 of the cap 25 is the entire cross section of the rigid outer container 10.

Figure 2:
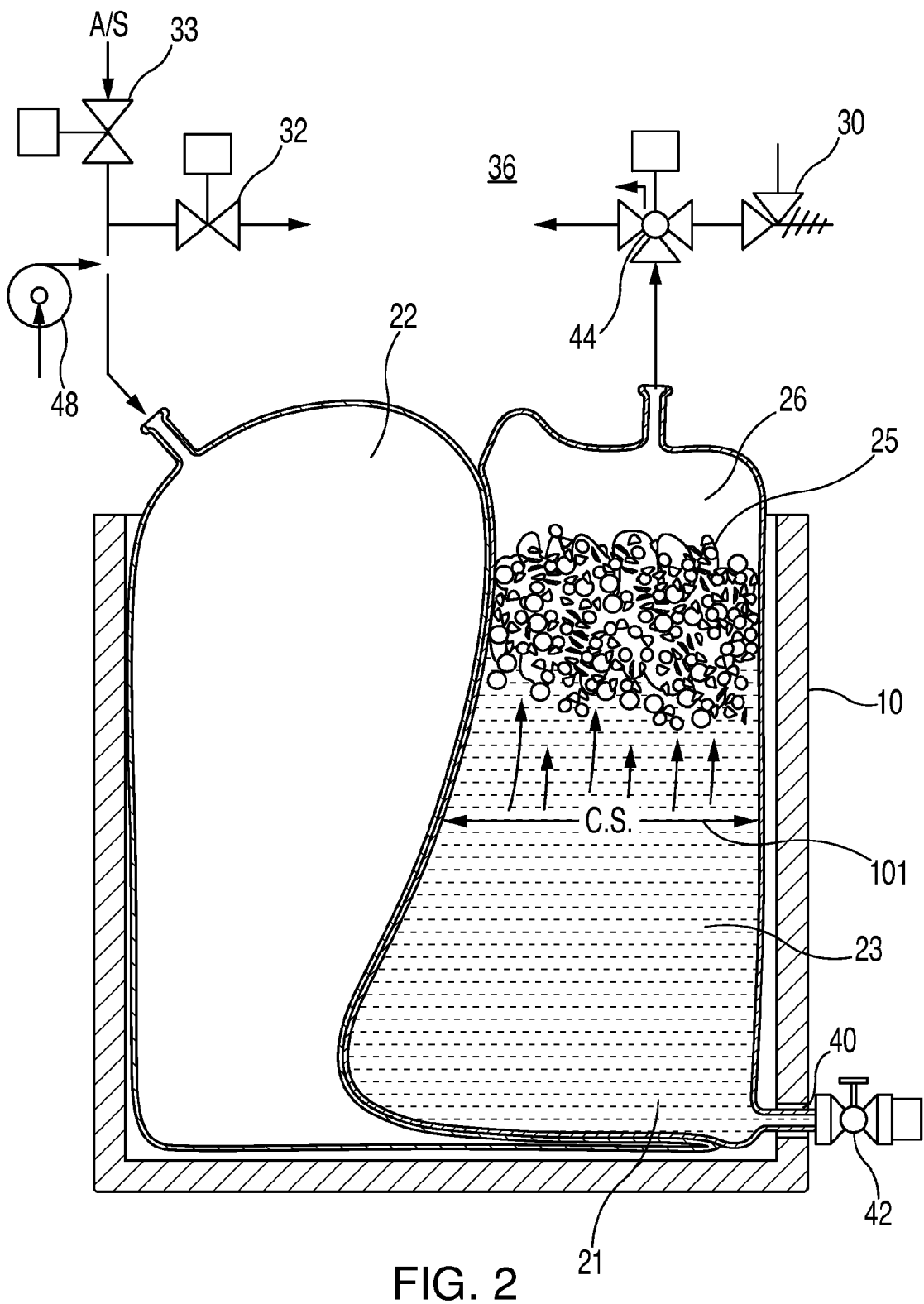
FIG. 2 is a side sectional view of the wine fermentation vessel illustrating the filled primary or fermentation chamber of the fermentation vessel with the secondary pressurization chamber inflated.

A means to periodically agitate the must and break up the cap 25 may be found by reference to FIG. 2. This figure shows a side sectional view of the configuration when pressurization chamber 22 is pressurized by activating a blower 48, or by the introduction of compressed air 34 through valve 33. Vent valve 32 is closed. The introduction of air causes pressurization chamber 22 to expand compressing the fermentation chamber 21. Three-way valve 44 is simultaneously energized to vent the headspace 26 to atmosphere 36. This causes excess gas in the headspace 26 to be forced out and fermentation chamber 21 distorts upwards. The expansion of the pressurization chamber 22 forces the liquid 23 in the fermentation chamber 21 upwards, squeezing the cap 25 through a reduced cross-section 101. This shears and breaks up the cap. Liquid 23 is also forced up through the broken cap 25 up into the headspace 26 completely wetting the cap and extracting color and flavor compounds.

Figure 3:
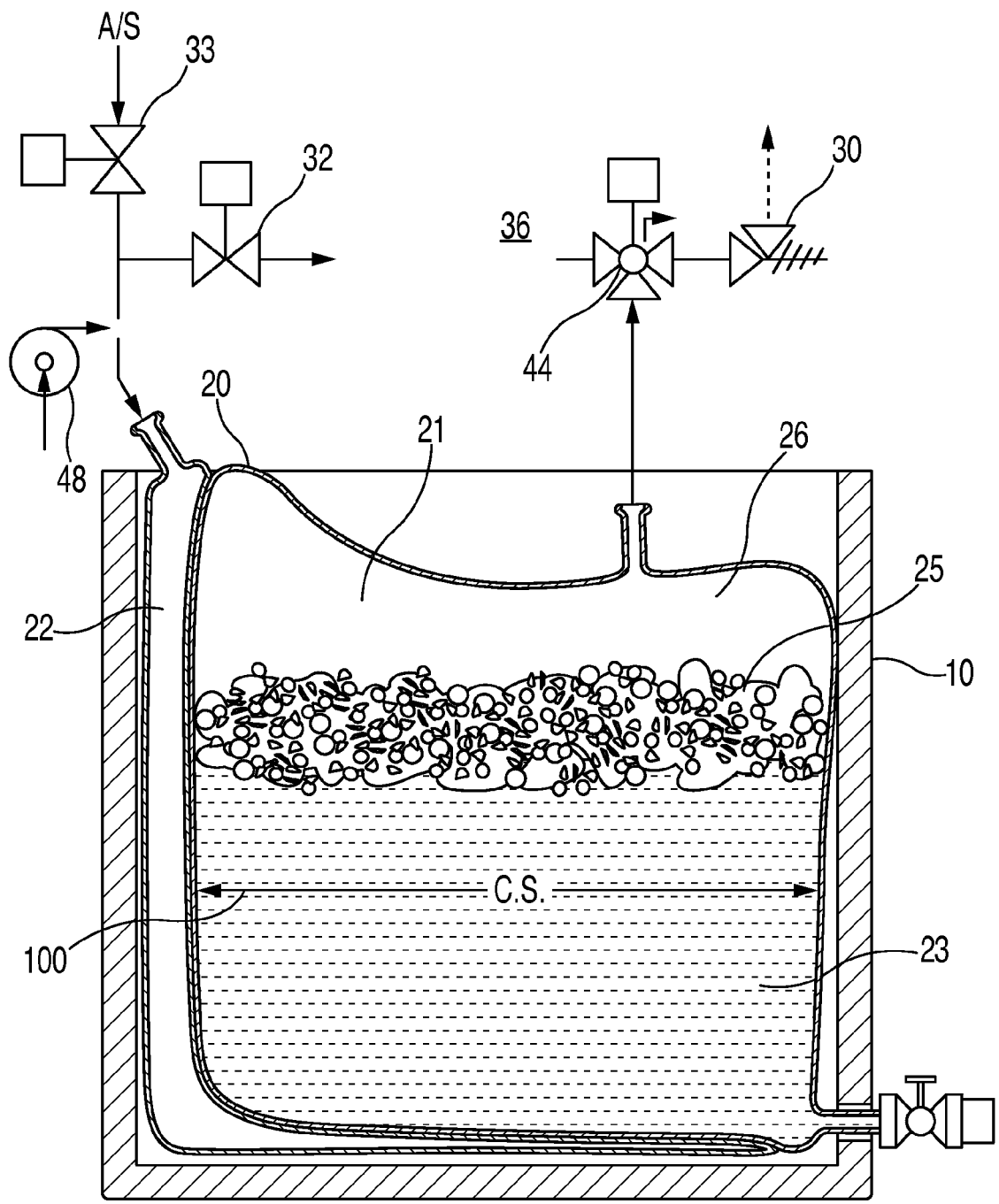
FIG. 3 is a side sectional view of the wine fermentation vessel illustrating the deflated, yet filled primary or fermentation chamber just after the secondary or pressurization chamber has been deflated.

After a few minutes in this pressurized configuration, the pressurization chamber 22 may be depressurized by either shutting off blower 48 or by opening valve 32 and closing valve 33. Since much of the headspace gas was forced out when the pressurization chamber was pressurized earlier, it is now no longer tautly inflated as shown in FIG. 3. However, there will be no air introduced into the headspace 26 so the fermentation still remains anaerobic. Three-way valve 44 switches to direct any vent gases from headspace 26 through the relief valve 30 and this does not permit any air to backflow into the fermentation vessel. As the fermentation continues, the $CO_2$ builds up again and the fermentation chamber 21 becomes tautly inflated and the system returns to the starting configuration shown in FIG. 1. This cap management operation may be repeated periodically (e.g., typically twice a day or as determined by the desired color extraction and flavor profile).

Figure 4:
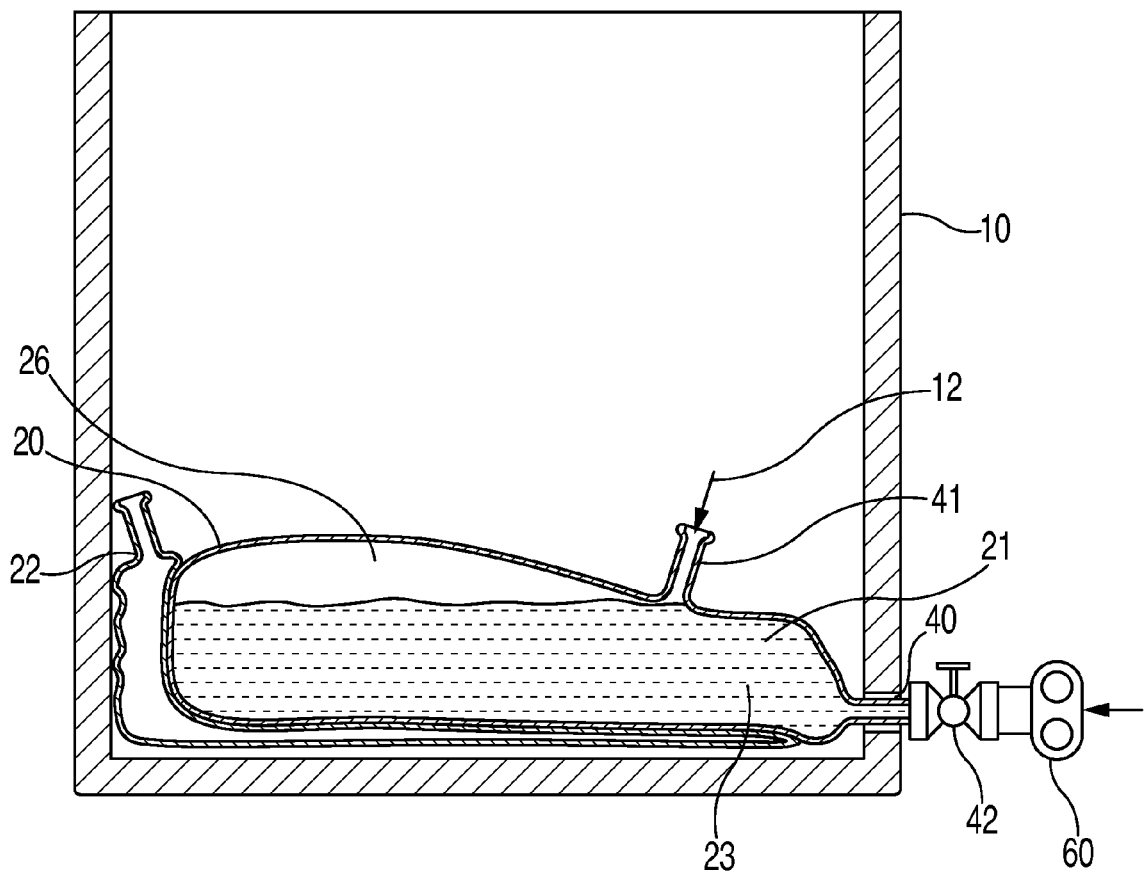
FIG. 4 is a side sectional view of the wine fermentation vessel showing how the empty primary or fermentation chamber is filled with minimal air contact.

In wine fermentation, it is critical that air be excluded from contact with the fermenting juice. In a preferred embodiment, the dual chamber bag 20 is supplied with both chambers 21, 22 completely empty. The empty bag 20 may be placed inside the rigid outer container 10 as shown in FIG. 4. The crushed grapes, grape juice, seeds, stems (i.e., must) may be pumped using pump 60 through the open supply/discharge valve 42 into the outlet connection 40 to fill the fermentation chamber 21. The fermentation chamber 21 expands with liquid as it is filled. The vent from the fermentation chamber is capped 12. There is essentially no air in the headspace 26 during this operation. The fermentation chamber 21 can alternatively be filled through the vent port 41 leaving the outlet 40 closed. Once the fermentation chamber 21 is filled to the required volume, supply/discharge 42 is closed and the fill pump 60 disconnected. The three-way valve 44 may then be connected so as to vent headspace gases through spring relief valve 30 if the pressure in the headspace exceeds a preset limit. The must is now inoculated with yeast and the fermentation begins. As $CO_2$ evolves during the fermentation, it fills the previously empty headspace 26 and maintains the desired anaerobic environment in the fermentation chamber 21.

Figure 5:
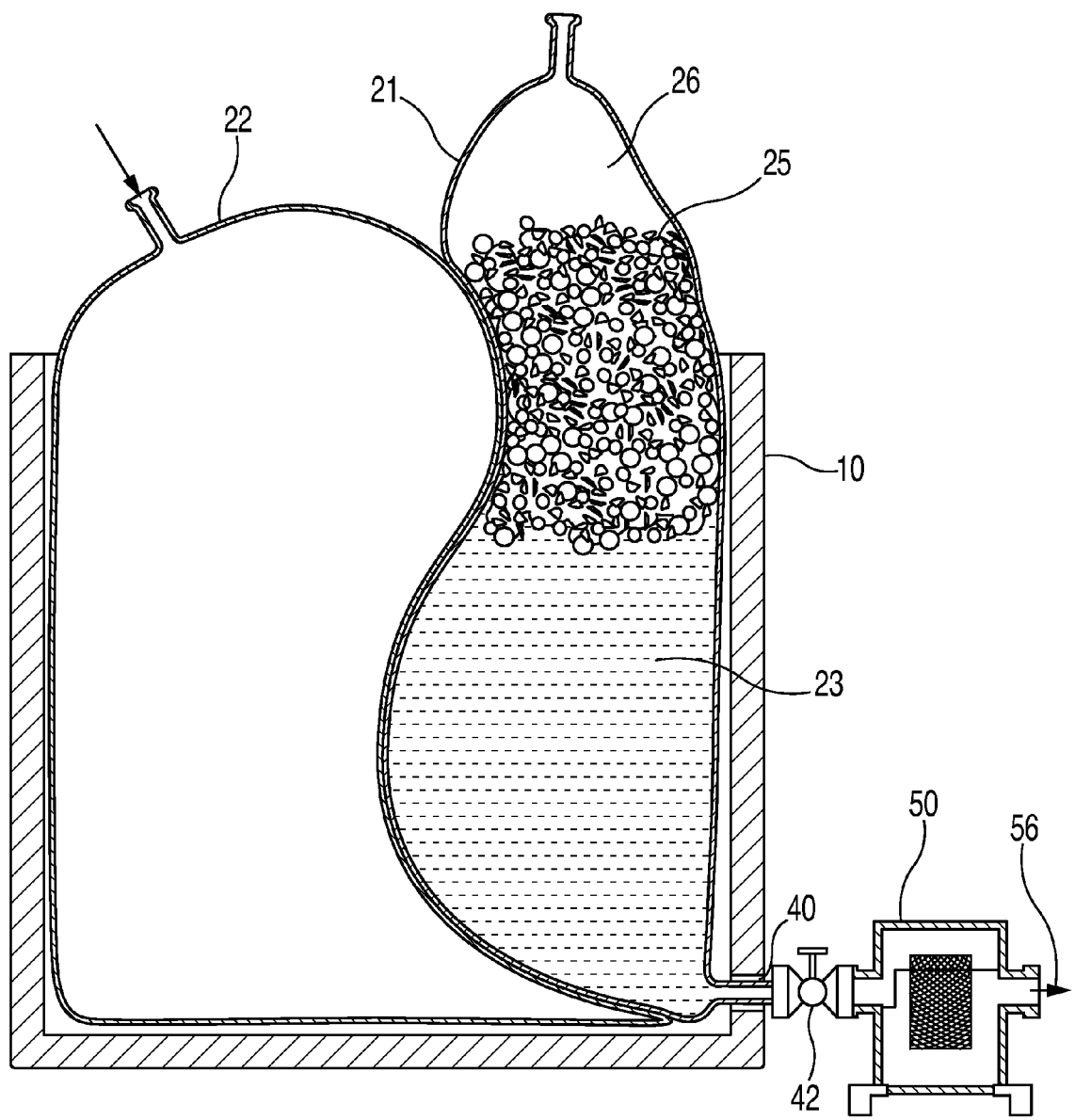
FIG. 5 is a side sectional view of the wine fermentation vessel illustrating the start of the pressing operation.
Figure 6:
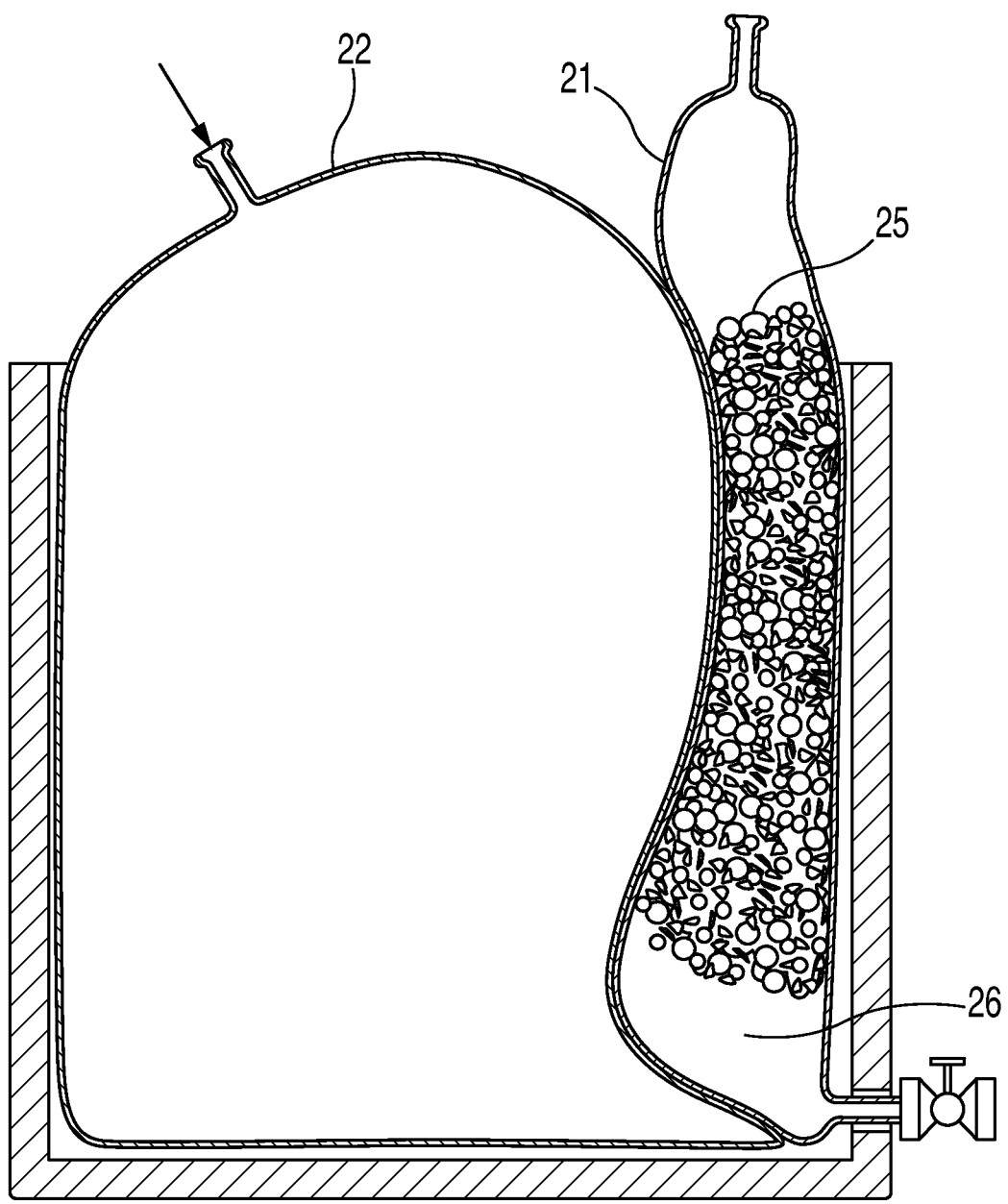
FIG. 6 is a side sectional view of the wine fermentation vessel illustrating the end of the pressing operation.

At the conclusion of the fermentation, it is necessary to press out the fermented juice separating it from the spent grape skins, seeds, stems, and yeast debris (i.e., pomace). FIG. 5 shows how this is done in the present embodiment. The apparatus may be allowed to rest for several hours prior to harvest. This allows the bulk of the pomace in the fermentation chamber 21 to float up to form a thick dense "cap". Then, a duplex basket strainer 50 (e.g., manufactured by Eaton Strainers, formally Hayward Strainers, of Hayward, Calif. USA) is connected to the supply/discharge valve 42. This particular unit had a 4" inlet and dual polymer baskets to trap solids. The unit is made of PVC and clear polyester. The duplex design allows a filled basket to be removed without interrupting the operation. A polyester strainer basket was used. These are available in mesh sizes from $\frac{1}{32}$" to $\frac{3}{16}$". The preferred embodiment utilized a $\frac{1}{32}$" mesh opening. Now the pressurization chamber 22 is then slowly pressurized by activating blower 44 or by opening valve 33 and closing valve 32. Three-way valve 44 is switched to vent the headspace to outlet 36. Now supply/discharge valve 42 is opened, introducing the fermented juice into the strainer 50. Clarified fermented juice flows out of strainer outlet 56 to collection vessels for further processing. Pressurization is maintained in pressurization chamber 22 until all the juice is pressed out of the fermentation chamber 21. This method of pressing is intrinsically very gentle and does not crush seeds and stems. This results in better flavor and the least extraction of unwanted astringent components. Some debris is collected in the strainer basket 58 and needs to be emptied periodically during the pressing operation, however, due to the gentle nature of the pressing in the present invention, there is no turbulence in the fermentation chamber and the bulk of the pomace 25 remains flocculated in the upper section of the fermentation. This material keeps getting compacted and pushed down as the liquid is forced out underneath. Once the flow of liquid from the fermentation chamber stops, the pressing operation is complete and supply/discharge valve 42 closed. Most of the pomace is retained in the bag as shown in FIG. 6. The bag is now disconnected, and the dual chamber bag 20 containing the waste pomace is simply thrown away or used as fertilizer.

Figure 7:
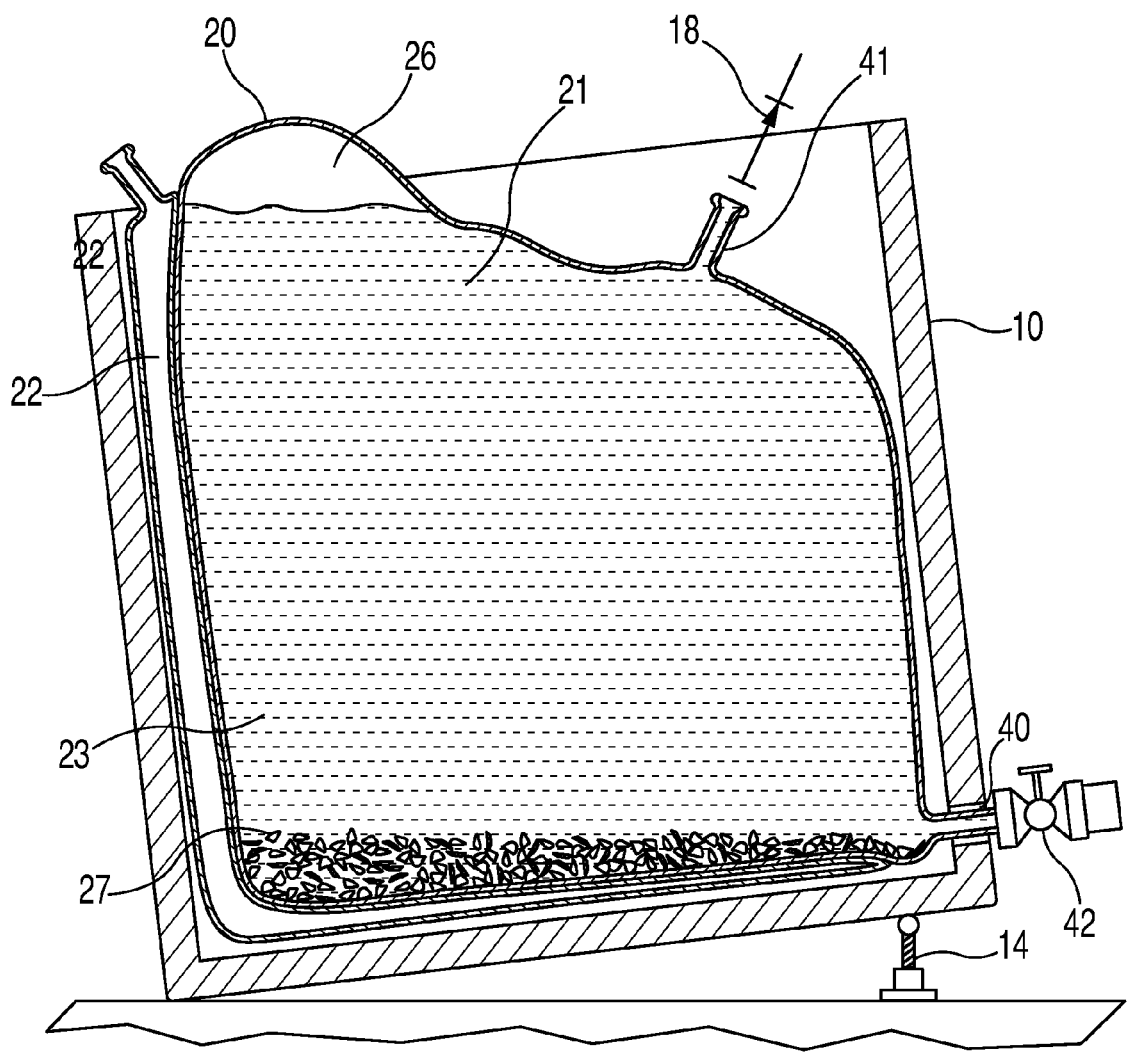
FIG. 7 is a side sectional view of the wine fermentation vessel illustrating how embodiments of the present invention may be used for racking.

The present embodiment can also be used for racking. Racking involves the repeated transfer from one container to another and is part of the wine aging process. Each racking involves the settling of sediments for many days or even weeks and then removal of the clarified wine to the next processing step. The settled solids (i.e., lees) are left behind. In the present embodiment the wine in fermentation chamber is allowed to settle with the pressurization chamber deflated and the rigid outer container 10 resting on a horizontal surface. A jack 14 can be used to keep the container tilted so that the solids 27 settle away from the outlet 40 as shown in FIG. 7. A check valve 18 can be provided on vent port 41 to prevent any ingress of air into the liquid chamber 21. When the solids have settled sufficiently, the outlet is connected to the next processing step and the supply/discharge valve 42 opened. The pressurization chamber is then pressurized and the flow begins as described for the pressing operation. The next process steps could be a tank or another dual chamber bag for a subsequent racking operation. This gentle transfer process minimizes disturbance of the settled solids and results in a clearer wine. It enables a much faster transfer than the traditional siphon.

Another application of the present embodiment is the shipment of fresh grapes for winemaking. Currently wineries have to be located near vineyards because fresh grapes must be processed within hours of being picked to assure quality wine. It is not practical to ship refrigerated wine grapes in large quantities because they will ferment and spoil unless utmost care is taken during packaging and transportation. The alternative of shipping frozen grapes is not cost effective beyond the hobby winemaking scale. Grape juice and derived products are not suitable for the production of high quality wine. However, with the present invention, rigid container 10 containing the dual chamber bag 20 can be filled with fresh crushed grapes at the vineyard. The must can then be chilled to around 45 to 55° F. and necessary additives and yeast added. The rigid container 10 is then shipped by refrigerated truck to the winery. The refrigeration temperature will inhibit spoilage, but more importantly the yeast will start the fermentation process and suppress any competing undesired organisms. The low temperature will inhibit full active growth of the yeast so only a partial fermentation will take place during the anticipated 3-5 day shipping time. Once the rigid container 10 is received at the winery, it is heated up slowly to fermentation temperature to jump start the fermentation and the cap management techniques described earlier can be applied. At the end of fermentation the fermented juice can be pressed out as described earlier. This operation makes it practical for small wineries to use wine grapes from vineyards located hundreds of miles away.

The prevent invention is mainly intended for the production of red wine. Here, the fermentation is performed in the presence of grape skins, seeds, and stems. However, it can also be used for white wine production. In white wine production, the crushed grapes (i.e., must) are pressed immediately after crushing and then only the clarified juice is fermented. With the present invention it is possible to fill the fermentation chamber 21 with must and then press immediately by pressurizing chamber 22 as described earlier. The clarified juice can be then be fermented in a fermentation vessel of the same design or in an alternate vessel.

Embodiments of the present invention may also be useful as a container for transporting crushed grapes (i.e., must) from the vineyard to remotely located wineries. The rigid outer container 10 would be suitable for shipment by truck. The inner flexible bag 20 would first be filled with must and inoculated with wine-making yeast. The container could then be shipped in a refrigerated (40-50° F.) state to slow down the metabolism of the yeast. The container with the partially fermented must would then be received at the winery, heated to a normal fermentation temperature (65-80° F.), and the wine fermentation completed as described earlier. Shipment could take up to 5 days, and the container having the vent with a relief valve would exhaust any $CO_2$ gases that may be generated during shipment.

Although the present invention has been described and illustrated in detail, it is to be clearly understood that the same is by way of illustration and example only, and is not to be taken by way of limitation. The scope of the present invention is to be limited only by the terms of the appended claims.

What is claimed:

1. A wine fermentation vessel adapted to receive pressed grapes, comprising:
    a clean, anaerobic environment comprising a dual chamber bag for fermentation of the pressed grapes to prevent contamination and a pressure relief valve that maintains the clean anaerobic environment;
    an agitator for compressing a cap formed by the pressed grapes to extract flavor and color from skins of the pressed grapes; and
    a wine outlet through which the fermented juice from the grapes within the wine fermentation vessel is compressed out in a downward direction so as to press out the fermented juice within the wine fermentation vessel without the need to transfer to another vessel.

2. The wine fermentation vessel according to claim 1, wherein said dual chamber bag has a fermentation chamber and a pressurization chamber; wherein the agitator compresses the fermentation chamber to distort the chamber in an upward direction.

3. The wine fermentation vessel according to claim 2, wherein said dual chamber bag comprises a flexible bag contained within a rigid outer container.

4. The wine fermentation vessel according to claim 2, wherein said pressurization chamber of said dual chamber bag further comprises an inlet coupled to receive air from a source of compressed air.

5. The wine fermentation vessel according to claim 4, wherein said source of compressed air comprises a blower.

6. The wine fermentation vessel according to claim 4, wherein said source of compressed air comprises:
- a compressed air tank;
- an supply valve coupling said compressed air tank to said pressurization chamber; and
- a vent valve coupled to selectively relieve pressure from said pressurization chamber.

7. The wine fermentation vessel of claim 1, wherein the agitator shears the cap formed by the pressed grapes.

8. A wine fermentation vessel adapted to receive pressed grapes, the vessel comprising:
- a clean, anaerobic environment for fermentation of the grapes to prevent contamination;
- an agitator for compressing a cap formed by the grapes to extract flavor and color from skins of the grapes; and
- a wine outlet through which the fermented juice from the grapes within the wine fermentation vessel is output,
- wherein the clean, anaerobic environment comprises a dual chamber bag having a fermentation chamber and a pressurization chamber, wherein said fermentation chamber comprises:
  - a vent port proximate to a top of said fermentation chamber;
  - a three-way valve coupled to said vent port and having a pair of chamber outlets, one of which is adapted to vent to atmosphere;
  - a relief valve coupled to another one of said pair of chamber outlets of said three-way valve,
  - wherein the wine outlet includes a port proximate to a bottom of said fermentation chamber and a supply/discharge valve adapted to open and close said port.

9. The wine fermentation vessel according to claim 8, wherein said relief valve further comprises a spring adapted to maintain a selected pressure within said fermentation chamber.

10. The wine fermentation vessel according to claim 8, further comprising a pump coupled to said supply/discharge valve.

11. The wine fermentation vessel according to claim 8, further comprising a strainer coupled to said supply/discharge valve.

12. The wine fermentation vessel according to claim 11, wherein said strainer comprises a dual basket strainer.

13. The wine fermentation vessel of claim 8, wherein the vessel is further configured to press out the fermented juice within the wine fermentation vessel through the port without the need to transfer to another vessel.

* * * * *